(12) United States Patent
Kling et al.

(10) Patent No.: US 10,533,450 B2
(45) Date of Patent: Jan. 14, 2020

(54) BALLISTIC LINER INSTALL METHODS

(71) Applicant: United Technologies Corporation, Farmington, CT (US)

(72) Inventors: Colin J. Kling, Glastonbury, CT (US); Darin S. Lussier, Guilford, CT (US); Mark W. Costa, Storrs, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 150 days.

(21) Appl. No.: 15/797,178

(22) Filed: Oct. 30, 2017

(65) Prior Publication Data
US 2019/0128136 A1 May 2, 2019

(51) Int. Cl.
*F01D 21/04* (2006.01)
*F01D 25/24* (2006.01)
*B29C 53/56* (2006.01)
*B29C 63/34* (2006.01)

(52) U.S. Cl.
CPC .......... *F01D 21/045* (2013.01); *B29C 53/562* (2013.01); *B29C 63/34* (2013.01); *F01D 25/24* (2013.01); *F05D 2220/32* (2013.01)

(58) Field of Classification Search
CPC ........ F01D 21/04; F01D 21/045; F01D 25/24; B29C 53/562; B29C 63/34; F05D 2220/32; F05D 2230/23; F05D 2250/15; F05D 2300/603
See application file for complete search history.

(56) References Cited

U.S. PATENT DOCUMENTS

| 5,403,148 | A  | * | 4/1995  | Forrester | F01D 21/045 415/200 |
| 6,113,347 | A  | * | 9/2000  | Forrester | F01D 21/045 415/173.4 |
| 6,979,172 | B1 | * | 12/2005 | Mackenzie | F01D 21/045 415/173.3 |
| 7,402,022 | B2 |   | 7/2008  | Harper et al. | |
| 2006/0165519 | A1 | * | 7/2006 | McMillan | F01D 21/045 415/173.1 |
| 2013/0216367 | A1 |   | 8/2013 | Lussier | |

(Continued)

FOREIGN PATENT DOCUMENTS

| EP | 2987963 A1 | 2/2016 |
| GB | 2422407 A  | 7/2006 |
| GB | 2442112 A  | 3/2008 |

OTHER PUBLICATIONS

The Extended European Search Report for Application No. 18203530.3-1006; dated Mar. 15, 2019; Report Received Date: Mar. 20, 2019; 9 pages.

*Primary Examiner* — Igor Kershteyn
(74) *Attorney, Agent, or Firm* — Cantor Colburn LLP (57) ABSTRACT

A gas turbine engine is provided. The gas turbine engine comprising: a fan section having a fan; and a containment zone encircling the fan, the containment zone comprising: a ballistic liner composed of a plurality of ring segments located radially outward of the fan; wherein each of the plurality of ring segments include two opposing circumferential ends, and wherein the plurality of ring segments are arranged circumferentially around the fan section and the circumferential ends of each of the plurality of ring segments meet at joints to form the ballistic liner.

30 Claims, 6 Drawing Sheets

(56) References Cited

U.S. PATENT DOCUMENTS

| | | |
|---|---|---|
| 2015/0354408 A1 | 12/2015 | Snyder |
| 2016/0053632 A1* | 2/2016 | Watson .................. B23P 15/04 415/9 |
| 2016/0069214 A1 | 3/2016 | Engebretsen et al. |
| 2017/0198714 A1 | 7/2017 | Lin et al. |
| 2017/0198717 A1 | 7/2017 | Crutchfield |

* cited by examiner

BALLISTIC LINER INSTALL METHODS

BACKGROUND

The subject matter disclosed herein generally relates to ballistic rings in gas turbine engines and, more particularly, to a method and apparatus for installing ballistic rings in gas turbine engines.

Gas turbine engines may generally include a fan section coupled to a core assembly. The core assembly may include a compressor section having one or more compressors, a combustion section, and a turbine section having one or more turbines. Each compressor includes multiple compressor blades while each turbine section includes multiple turbine blades. The compressor and turbine blades are disposed within a core case and are rotated rapidly during operation.

It is possible, although unlikely, for a compressor or turbine blade, or a fragment thereof, to separate during operation and strike the core case. Accordingly, core cases are often designed to contain blades and blade fragments, thereby to prevent any liberated material from radially exiting the engine. The demands of blade containment, however, are balanced by the demands for low weight, high strength, and manufacturability. Adequate containment is often obtained by increasing the thickness of the core case sufficiently to resistant penetration by a blade or blade fragment. A thicker core case, however, is difficult to assemble as the thicker core must be bent in a complex and difficult manor to form to the adjacent engine surface, thereby decreasing manufacturability.

SUMMARY

According to one embodiment, a gas turbine engine is provided. The gas turbine engine comprising: a fan section having a fan; and a containment zone encircling the fan, the containment zone comprising: a ballistic liner composed of a plurality of ring segments located radially outward of the fan; wherein each of the plurality of ring segments include two opposing circumferential ends, and wherein the plurality of ring segments are arranged circumferentially around the fan section and the circumferential ends of each of the plurality of ring segments meet at joints to form the ballistic liner.

In addition to one or more of the features described above, or as an alternative, further embodiments may include that each joint is a butt joint and the butt joints are staggered such that the butt joints of each of the plurality of ring segments are not aligned.

In addition to one or more of the features described above, or as an alternative, further embodiments may include that the plurality of ring segments are oriented radially in layers.

In addition to one or more of the features described above, or as an alternative, further embodiments may include that the plurality of ring segments includes a first ring segment located radially outward from the fan section and a second ring segment located radially outward from the first ring segment.

In addition to one or more of the features described above, or as an alternative, further embodiments may include that the ballistic liner is adhered to a containment zone casing located radially outward of the ballistic liner.

In addition to one or more of the features described above, or as an alternative, further embodiments may include that each of the plurality of ring segments are secured to each other through an adhesive.

In addition to one or more of the features described above, or as an alternative, further embodiments may include that a butt joint angle of each butt joint is different from a fan blade angle of the fan.

In addition to one or more of the features described above, or as an alternative, further embodiments may include that the circumferential ends overlap at the joints.

In addition to one or more of the features described above, or as an alternative, further embodiments may include that the joints are at least one of a lap joint and a scarf joint.

In addition to one or more of the features described above, or as an alternative, further embodiments may include that the plurality of ring segments are oriented circumferentially in single layer.

In addition to one or more of the features described above, or as an alternative, further embodiments may include that the ballistic liner is adhered to a containment zone casing located radially outward of the ballistic liner.

According to another embodiment, a method of installing a ballistic liner for a containment zone of a gas turbine engine is provided. The method comprising: applying an adhesive to a radially inward surface of a containment casing in the containment zone, wherein the containment casing is located radially outward of a fan of the gas turbine engine; attaching a ballistic liner to the adhesive, wherein the ballistic liner is composed of a plurality of ring segments and each of the plurality of ring segments include two opposing circumferential ends, and wherein the plurality of ring segments are arranged circumferentially around the fan section and the circumferential ends of each of the plurality of ring segments meet at joints to form the ballistic liner; applying a pressure to a radially inward surface of the ballistic liner; and curing the adhesive.

In addition to one or more of the features described above, or as an alternative, further embodiments may include staggering the joints such that the joints of each of the plurality of ring segments are not aligned, wherein each joint is a butt joint.

In addition to one or more of the features described above, or as an alternative, further embodiments may include layering the plurality of ring segments such that the plurality of ring segments are oriented radially in layers; and applying adhesive between each layer.

In addition to one or more of the features described above, or as an alternative, further embodiments may include that the containment zone casing is composed of a ballistic material.

In addition to one or more of the features described above, or as an alternative, further embodiments may include that a butt joint angle of each butt joint is different from a fan blade angle of the fan of the fan section.

In addition to one or more of the features described above, or as an alternative, further embodiments may include overlapping the circumferential ends at the joints.

In addition to one or more of the features described above, or as an alternative, further embodiments may include that the joints are at least one of a lap joint and a scarf joint.

In addition to one or more of the features described above, or as an alternative, further embodiments may include that the plurality of ring segments are oriented circumferentially in single layer.

According to another embodiment, a method of installing a ballistic liner for a containment zone of a gas turbine engine is provided. The method comprising: applying an adhesive to a radially inward surface of a containment casing in the containment zone, wherein the radially inward surface is located radially outward of a fan of the gas turbine engine; inserting a ballistic liner radially inward of the containment casing, wherein the a ballistic liner is composed of a coiled ring having a plurality of layers and the coiled ring is continuous sheet wound to a first diameter; allowing the ballistic liner to spring out to a final diameter; attaching a ballistic liner to the adhesive; injected adhesive in-between each layer of the coiled ring; applying a pressure to a radially inward surface of the ballistic liner; and curing the adhesive.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
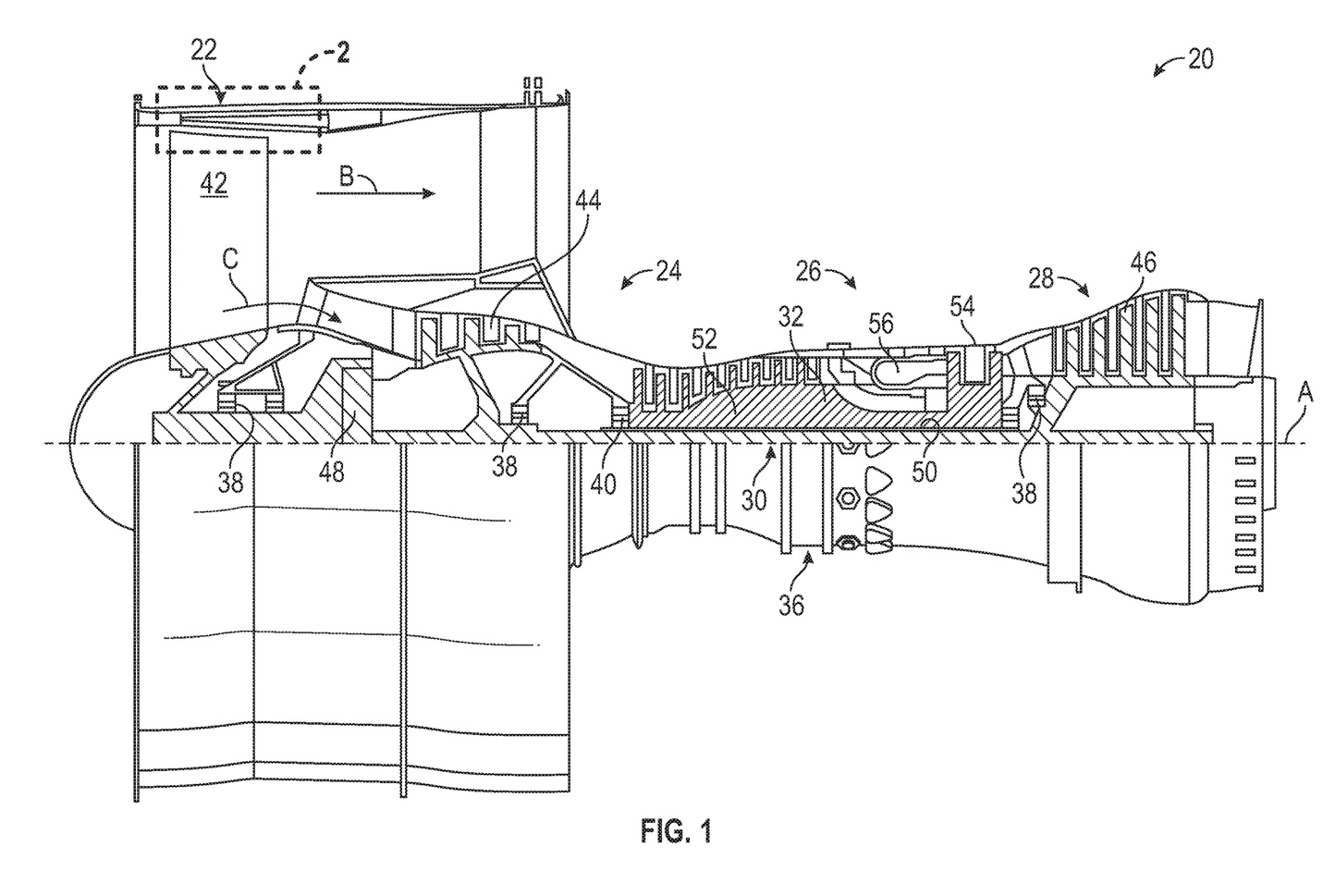
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

Figure 2:
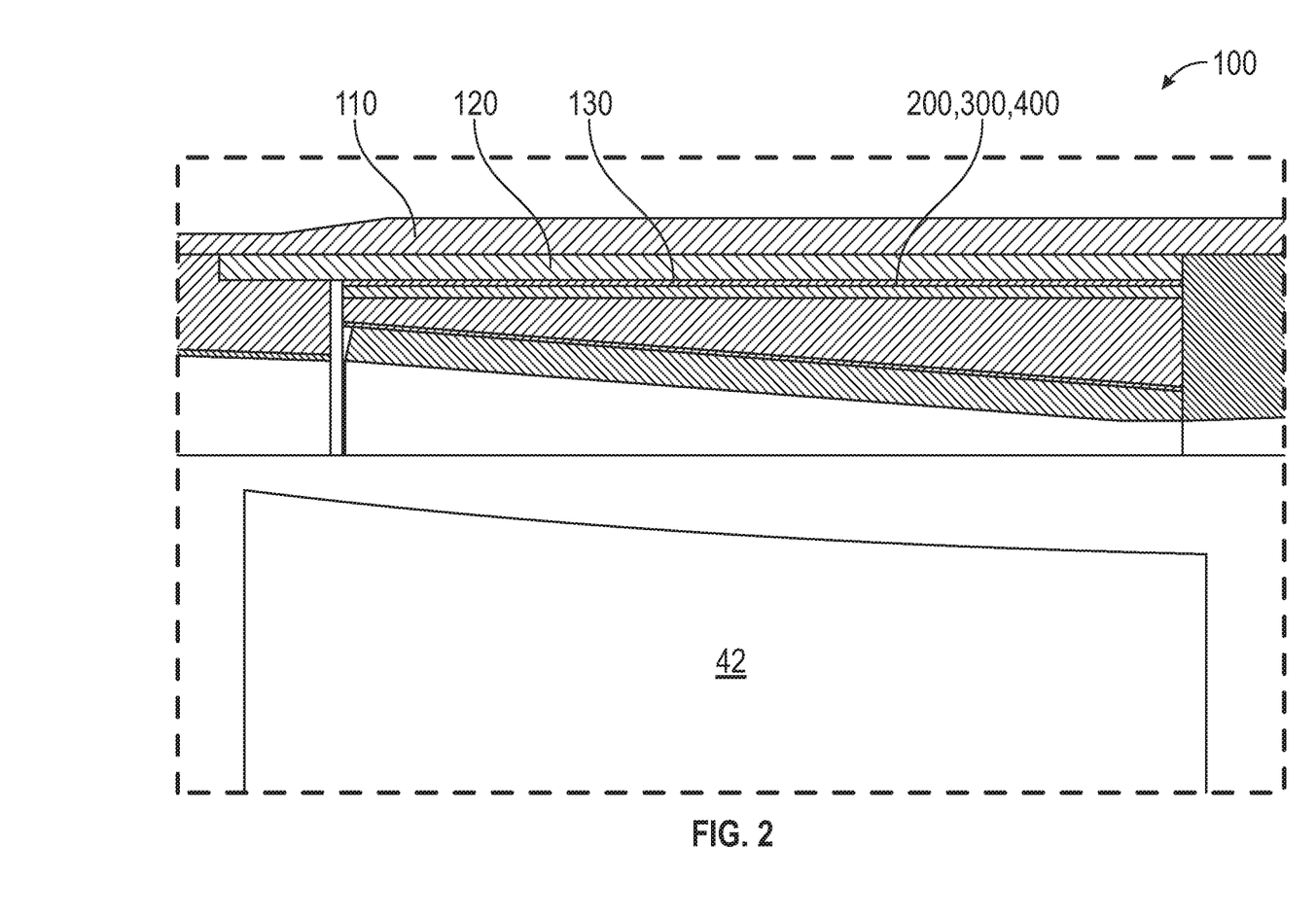
FIG. 2 is a cross-sectional illustration of a containment zone for a fan section of the gas turbine engine of FIG. 1, in accordance with an embodiment of the disclosure.

Referring now to FIG. 2 with continued reference to FIG. 1. FIG. 2 shows a containment zone 100 located radially outward from the fan 42. The containment zone 100 includes a carbon case 110 and a containment zone casing 120 located radially inward from the carbon case 110. The containment zone casing 120 may be composed of a ballistic material such as, for example, Kevlar. A ballistic liner 200, 300, 400 is located radially inward from the containment zone casing 120 and is bonded to the containment zone casing 120 using an adhesive 130. The adhesive 130 may be semi-compliant.

The current process by which the ballistic liner 200, 300, 400 is bonded into the case is cumbersome. Due to the relatively tight gap between the containment zone casing 120 and the ballistic liner 200, 300, 400, the ballistic liner 200, 300, 400 must be fixtured in the Containment zone casing 120 while both the Containment zone casing 120 and the ballistic liner 200, 300, 400 are held round during the bond process. Once properly fixtured, the adhesive system is injected into a bond gap 140. Fixturing the components, controlling the adhesive flow, and completing the injection prior to the adhesive beginning to solidify is difficult. Embodiments disclosed herein seek to address the difficulties of installing the through three configurations of ballistic liners 200, 300, 400.

Figure 3:
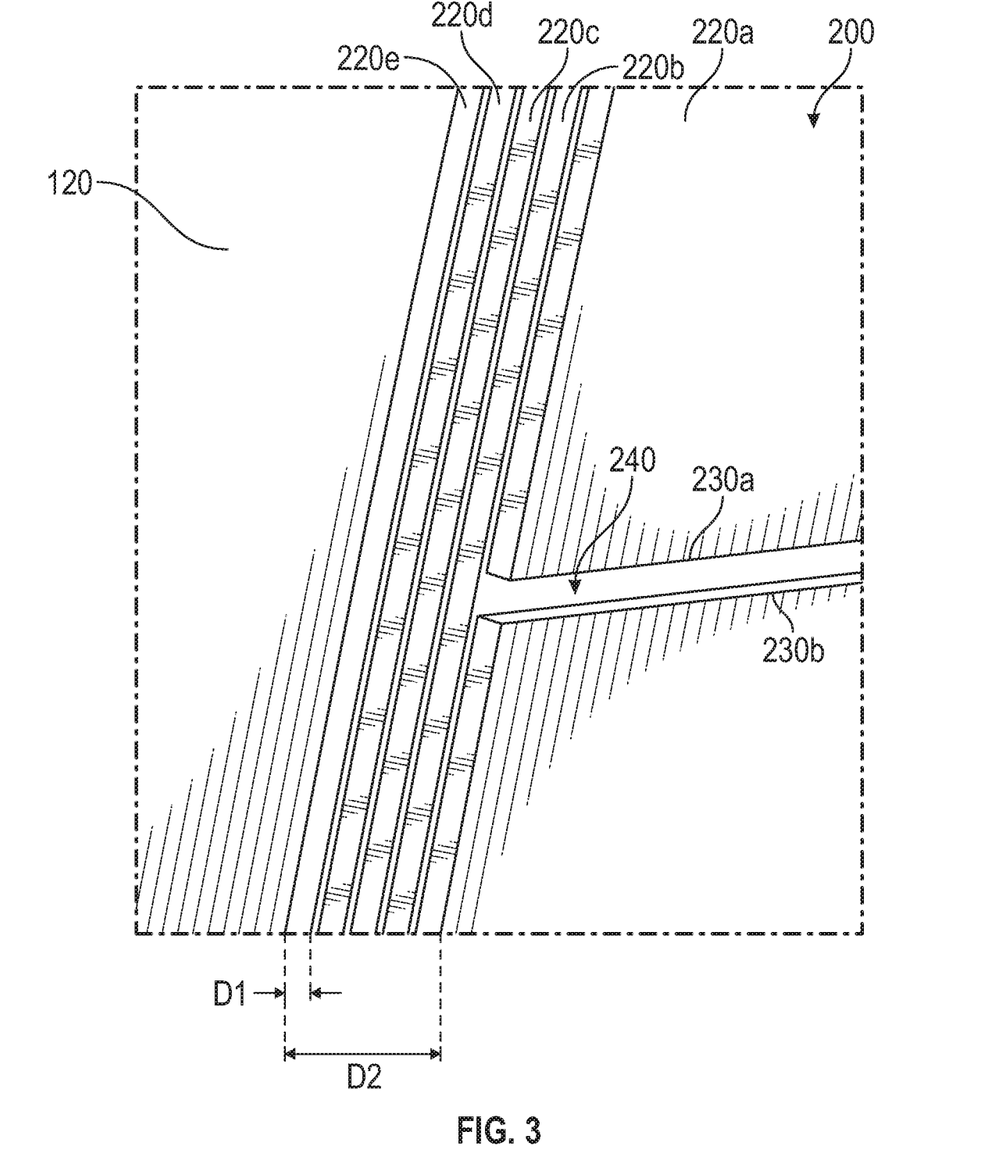
FIG. 3 is an illustration of a ballistic liner for the containment zone of FIG. 2, in accordance with an embodiment of the disclosure.
Figure 4:
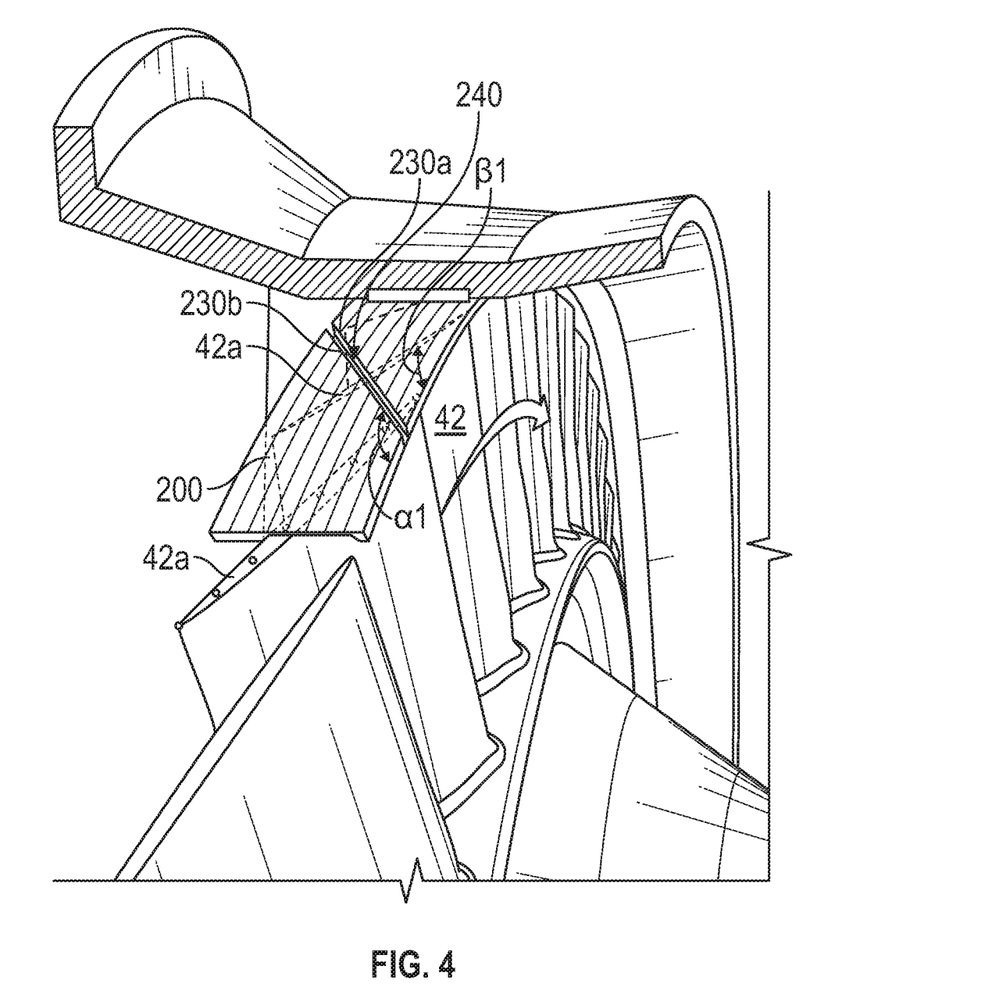
FIG. 4 is an illustration of a ballistic liner of FIG. 3 within the containment zone of FIG. 2, in accordance with an embodiment of the disclosure.

Referring now to FIGS. 3 and 4 with continued reference to FIGS. 1-2. FIGS. 3 and 4 show a first configuration of the ballistic liner 200, according to an embodiment of the present disclosure. The first configuration of the ballistic liner 200 includes a plurality of ring segments 220a-220e used to form a single layer or lamina of the ballistic liner 200. Each of the ring segments 220a-220e may be composed of sheet metal. The ballistic liner may be comprised of multiple ring segments 220a-220e, depending upon the individual thickness D1 of each ring segments 220a-220e and required containment thickness or overall thickness D2. The plurality of ring segments 220a-220e are oriented radially in layers, as seen in FIG. 3. FIG. 3 displays four ring segments 220a-220e but it is understood that the number of ring segments 220a-220e may vary depending on the individual thickness D1 and required containment thickness or overall thickness D2.

Each ring segment 220a-220e is a single continuous piece of material with two opposing circumferential ends 230a, 230b. Each ring segment 220a-220e will be wrapped circumferentially and the two circumferential ends 230a, 230b will meet to form a butt joint 240. The circumferential ends would be staggered to avoid aligning the butt joints 240 between ring segments 220a-220e. Each ring segment 220a-220e may be bonded to the containment zone casing 120 and/or prior outboard segments, and each may share a common cure cycle. As seen in FIG. 4, the two circumferential ends 230a, 230b may meet at a butt joint 240 having a butt joint angle α1 different from a fan blade angle β1. Advantageously, by differing the butt joint angle α1 from the fan blade angle β1, it helps avoid a clear path for fan blade fragments to escape through the butt joint 240 in the event the butt joint angle α1 and the blade angle β1 are about equivalent and aligned.

Figure 5:
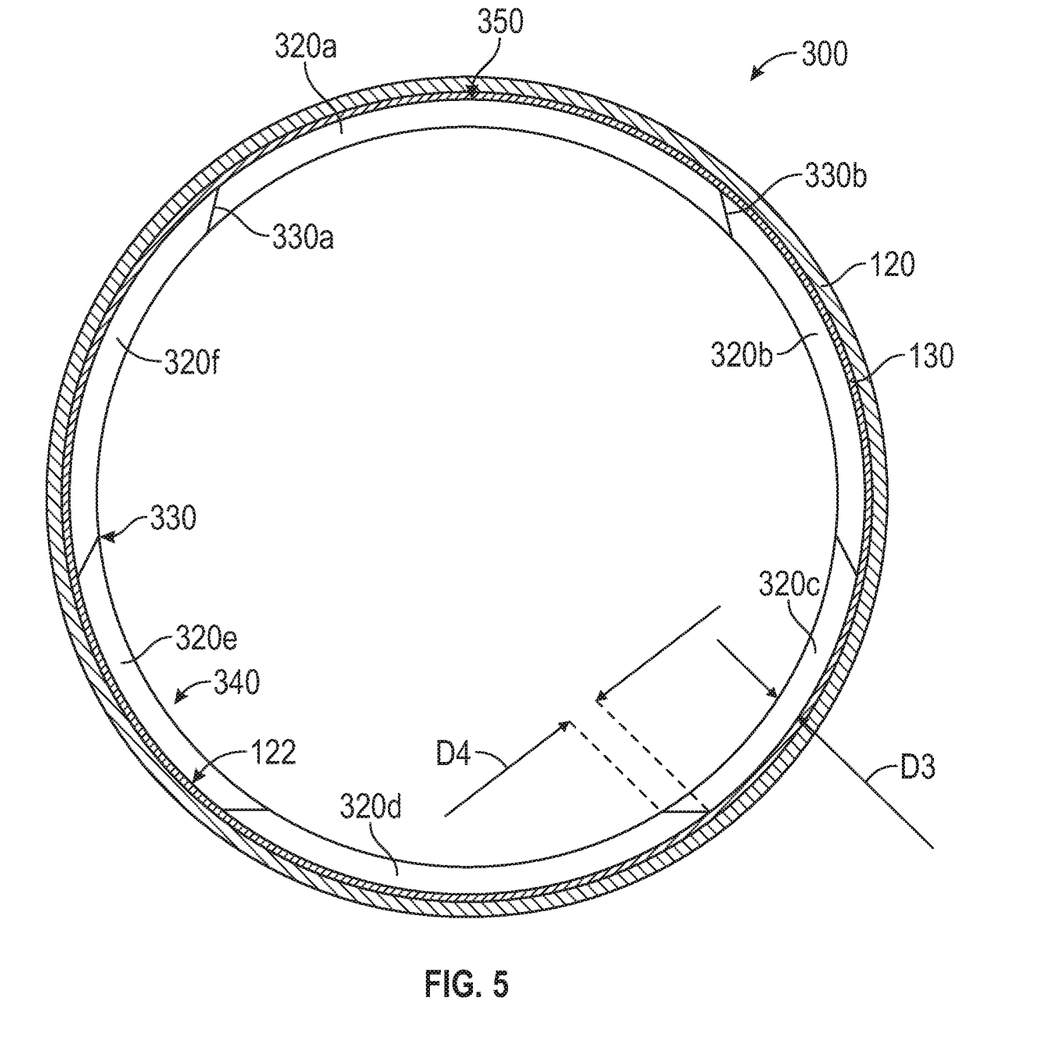
FIG. 5 is an illustration of a ballistic liner for the containment zone of FIG. 2, in accordance with an embodiment of the disclosure.

Referring now to FIG. 5 with continued reference to FIGS. 1-2. FIG. 5 shows a second configuration of the ballistic liner 300, according to an embodiment of the present disclosure. The second configuration of the ballistic liner 300 includes a plurality ring segments 320a-320f. Circumferential ends 330a, 330b of each ring segments 320a-320f may overlap and/or interlock at joints 330 to form the ballistic liner 300, as seen in FIG. 5. Each joint 330 may be a lap joint or a scarf joint. Advantageously, utilizing a lap joint or a scarf joint at the circumferential end 330a, 330b helps to minimize the impact to containment capability. Each ring segment 320a-320f may vary in thickness D3 and also may vary in a length D4 of the circumferential end 330a, 330b. In order to assemble the second configuration of the ballistic liner 300 an adhesive would be applied to a radially inward surface 122 of the containment zone casing 120 and/or the radially outward surface 350 of each of the plurality of ring segments 320a-320f. Then the plurality of ring segments 320a-320f would be attached to the inward surface 122 through the adhesive 130 to form the ballistic liner 300, and pressure would be applied to an inner surface 340 of the ballistic liner 300 in secure the bond between the adhesive 130 and each of the plurality of ring segments 320a-320f. Pressure may be applied to the inner surface 340 by either an autoclave and/or a vacuum in two non-limiting examples.

Figure 6:
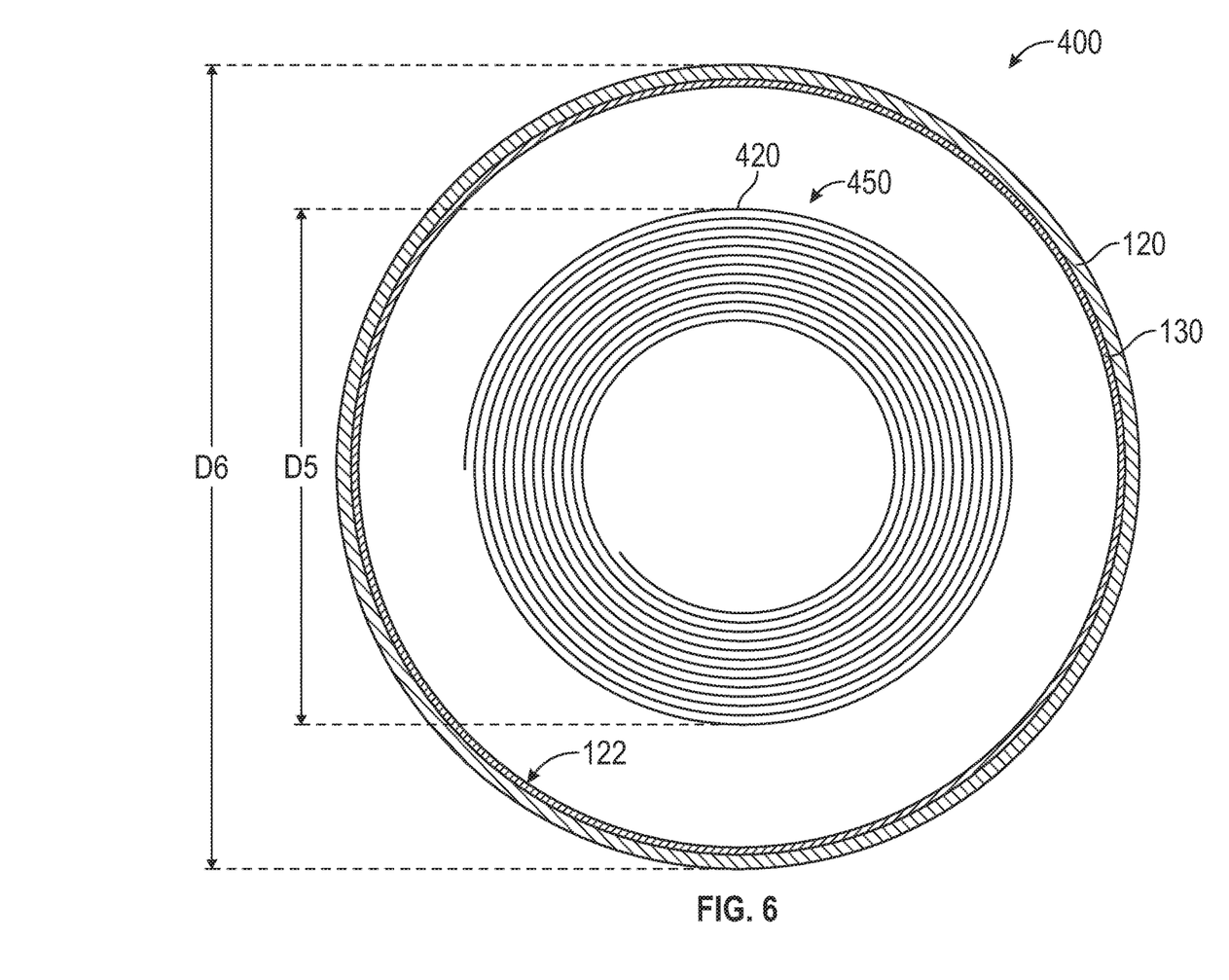
FIG. 6 is an illustration of a ballistic liner for the containment zone of FIG. 2, in accordance with an embodiment of the disclosure.

Referring now to FIG. 6 with continued reference to FIGS. 1-2. FIG. 6 shows a third configuration of the ballistic liner 400, according to an embodiment of the present disclosure. The third configuration of the ballistic liner 400 includes one or more coiled rings 420. The coiled ring 420 may be composed of a continuous metallic sheet that is wound to a diameter D5 smaller than the final required diameter D6, then allowed to "spring" out or otherwise expand to the containment zone casing 120. An adhesive 130 may be used to adhere the ballistic liner 400 to a radially inward surface 122 of the containment zone casing 120. The adhesive 130 may be a scrim supported adhesive, or use spacers and receive adhesive between the layers of the coiled ring 420 at an injection or infusion step. Once the coiled ring 420 is expanded or allowed to "spring" out and adhere to the Containment zone casing 120 then the adhesive 130 may require a cure cycle. During cure, vacuum or autoclave pressure would be used to hold the coiled ring 120 in place.

Technical effects of embodiments of the present disclosure include simplification of the alignment and installation of a ballistic liner in a gas turbine engine by sub-dividing the ballistic liner into segments and installing each segment individually and/or unraveling the ballistic liner from a coiled ring for installation, which allow the ballistic liner to better form to the engine containment zone casing.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:
a fan section having a fan; and
a containment zone encircling the fan, the containment zone comprising:
a ballistic liner composed of a plurality of ring segments located radially outward of the fan, each of the plurality of ring segments comprising:
two opposing circumferential ends including a first circumferential end and a second circumferential end opposite the first circumferential end;
a radially inward surface extending from the first circumferential end to the second circumferential end,
a radially outward surface opposite the radially inward surface, the radially inward surface extending from the first circumferential end to the second circumferential end; and
a joint surface at each of the circumferential ends, the joint surface extending from the radially inward surface to the radially outward surface, and wherein the joint surface is about perpendicular to the radially inward surface and the radially outward surface,
wherein the plurality of ring segments are arranged circumferentially around the fan section and the circumferential ends of each of the plurality of ring segments meet at joints to form the ballistic liner,
wherein the plurality of ring segments are oriented radially in layers, and
wherein each joint is a butt joint and the butt joints are staggered such that the butt joints of each of the plurality of ring segments are not aligned radially outward through the layers.

2. The gas turbine engine of claim 1, wherein the plurality of ring segments includes a first ring segment located radially outward from the fan section and a second ring segment located radially outward from the first ring segment.

3. The gas turbine engine of claim 1, wherein the ballistic liner is adhered to a containment zone casing located radially outward of the ballistic liner.

4. The gas turbine engine of claim 1, wherein each of the plurality of ring segments are secured to each other through an adhesive.

5. The gas turbine engine of claim 1, wherein a butt joint angle of each butt joint is different from a fan blade angle of the fan.

6. The gas turbine engine of claim 1, wherein the ballistic liner is adhered to a containment zone casing located radially outward of the ballistic liner.

7. A method of installing a ballistic liner for a containment zone of a gas turbine engine, the method comprising:
applying an adhesive to a radially inward surface of a containment casing in the containment zone, wherein the containment casing is located radially outward of a fan of the gas turbine engine;
attaching a ballistic liner to the adhesive, wherein the ballistic liner is composed of a plurality of ring segments and each of the plurality of ring segments include two opposing circumferential ends, and wherein the plurality of ring segments are arranged circumferentially around the fan section and the circumferential ends of each of the plurality of ring segments meet at joints to form the ballistic liner;
layering the plurality of ring segments such that the plurality of ring segments are oriented radially in layers;
applying adhesive between each layer,
applying a pressure to a radially inward surface of the ballistic liner; and
curing the adhesive.

8. The method of claim 7, further comprising:
staggering the joints such that the joints of each of the plurality of ring segments are not aligned, wherein each joint is a butt joint.

9. The method of claim 7, wherein the containment zone casing is composed of a ballistic material.

10. The method of claim 8, wherein a butt joint angle of each butt joint is different from a fan blade angle of the fan of the fan section.

11. The method of claim 8, further comprising:
overlapping the circumferential ends at the joints.

12. The method of claim 11, wherein the joints are at least one of a lap joint and a scarf joint.

13. A method of installing a ballistic liner for a containment zone of a gas turbine engine, the method comprising:
applying an adhesive to a radially inward surface of a containment casing in the containment zone, wherein the radially inward surface is located radially outward of a fan of the gas turbine engine;
inserting a ballistic liner radially inward of the containment casing, wherein the ballistic liner is composed of a coiled ring having a plurality of layers and the coiled ring is continuous sheet wound to a first diameter;
allowing the ballistic liner to spring out to a final diameter;
attaching a ballistic liner to the adhesive;
injected adhesive in-between each layer of the coiled ring;
applying a pressure to a radially inward surface of the ballistic liner; and
curing the adhesive.

14. A gas turbine engine comprising:
a fan section having a fan; and
a containment zone encircling the fan, the containment zone comprising:
a ballistic liner composed of a plurality of ring segments located radially outward of the fan, each of the plurality of ring segments comprising:
two opposing circumferential ends including a first circumferential end and a second circumferential end opposite the first circumferential end;
a forward surface extending from the first circumferential end to the second circumferential end;

an aft surface opposite the forward inward surface, the aft surface extending from the first circumferential end to the second circumferential end; and a joint surface at each of the circumferential ends, the joint surface extending from the forward surface to the aft outward surface, wherein the joint surface is oriented at an angle that is a non-perpendicular angle relative to the forward surface, and wherein the joint surface is oriented at an angle that is different from a fan blade angle of the fan, and wherein the plurality of ring segments are arranged circumferentially around the fan section and the circumferential ends of each of the plurality of ring segments meet at joints to form the ballistic liner.

15. The gas turbine engine of claim 14, wherein each joint is a butt joint and the butt joints are staggered such that the butt joints of each of the plurality of ring segments are not aligned.

16. The gas turbine engine of claim 15, wherein the plurality of ring segments are oriented radially in layers.

17. The gas turbine engine of claim 15, wherein the plurality of ring segments includes a first ring segment located radially outward from the fan section and a second ring segment located radially outward from the first ring segment.

18. The gas turbine engine of claim 15, wherein the ballistic liner is adhered to a containment zone casing located radially outward of the ballistic liner.

19. The gas turbine engine of claim 15, wherein each of the plurality of ring segments are secured to each other through an adhesive.

20. The gas turbine engine of claim 14, wherein the circumferential ends overlap at the joints.

21. The gas turbine engine of claim 20, wherein the joints are at least one of a lap joint and a scarf joint.

22. The gas turbine engine of claim 20, wherein the plurality of ring segments are oriented circumferentially in single lays.

23. The gas turbine engine of claim 20, wherein the ballistic liner is adhered to a containment zone casing located radially outward of the ballistic liner.

24. A method of installing a ballistic liner for a containment zone of a gas turbine engine, the method comprising:

applying an adhesive to a radially inward surface of a containment casing in the containment zone, wherein the containment casing is located radially outward of a fan of the gas turbine engine;

attaching a ballistic liner to the adhesive, wherein the ballistic liner is composed of a plurality of ring segments, each of the plurality of ring segments comprising:

two opposing circumferential ends including a first circumferential end and a second circumferential end opposite the first circumferential end;

a forward surface extending from the first circumferential end to the second circumferential end;

an aft surface opposite the forward inward surface, the aft surface extending from the first circumferential end to the second circumferential end; and a joint surface at each of the circumferential ends, the joint surface extending from the forward surface to the aft outward surface, wherein the joint surface is oriented at an angle that is a non-perpendicular angle relative to the forward surface, and wherein the joint surface is oriented at an angle that is different from a fan blade angle of the fan, and applying a pressure to a radially inward surface of the ballistic liner; and curing the adhesive, wherein the plurality of ring segments are arranged circumferentially around the fan section and the circumferential ends of each of the plurality of ring segments meet at joints to form the ballistic liner.

25. The method of claim 24, further comprising:
staggering the joints such that the joints of each of the plurality of ring segments are not aligned, wherein each joint is a butt joint.

26. The method of claim 24, further comprising:
layering the plurality of ring segments such that the plurality of ring segments are oriented radially in layers; and
applying adhesive between each layer.

27. The method of claim 24, wherein the containment zone casing is composed of a ballistic material.

28. The method of claim 24, further comprising:
overlapping the circumferential ends at the joints.

29. The method of claim 28, wherein the joints are at least one of a lap joint and a scarf joint.

30. The method of claim 28, wherein the plurality of ring segments are oriented circumferentially in single layer.

* * * * *